United States Patent [19]
Sawyer et al.

[11] Patent Number: 4,564,368
[45] Date of Patent: Jan. 14, 1986

[54] METHOD AND APPARATUS FOR USE IN DRYING BIOMASS PARTICLES

[76] Inventors: Willard C. Sawyer; Edith M. Sawyer; Sherron M. Keef; John W. Sawyer, all of R.F.D. #2, Oxford, Me. 04270

[21] Appl. No.: 483,840

[22] Filed: Apr. 11, 1983

[51] Int. Cl.$^4$ ............................ C10L 5/40; C10L 9/08
[52] U.S. Cl. ...................................... 44/1 D; 44/1 E; 44/2; 34/13.8; 34/16.5; 34/145; 34/175
[58] Field of Search .................. 44/1 E, 2, 1 D, 10 B; 34/13.8, 16.5, 38.0, 145, 175, 225, 227, 237

[56] References Cited

U.S. PATENT DOCUMENTS

| 27,237 | 2/1860 | Smith | 34/237 |
|---|---|---|---|
| 100,301 | 3/1870 | Lyons | 34/237 |
| 270,359 | 1/1883 | Allen | 34/175 |
| 307,116 | 10/1884 | Jennings | 34/145 |
| 3,824,705 | 7/1974 | Ives | 34/227 X |

*Primary Examiner*—Carl F. Dees

[57] ABSTRACT

Method and apparatus for use in drying biomass particles provide a dryer having a chamber for a predetermined volume of biomass particles with apertures distributed throughout one boundary of the chamber enabling hot gas to be introduced and forced through the particles to exit from the opposite boundary. The gas stream to the chamber is so regulated that a layer of particles adjacent the opposite boundary functions as a relatively cool filter bed operable to prevent, to a desired extent, noxious liquids, gaseous, or particulate emissions from exiting from the dryer.

10 Claims, 4 Drawing Figures

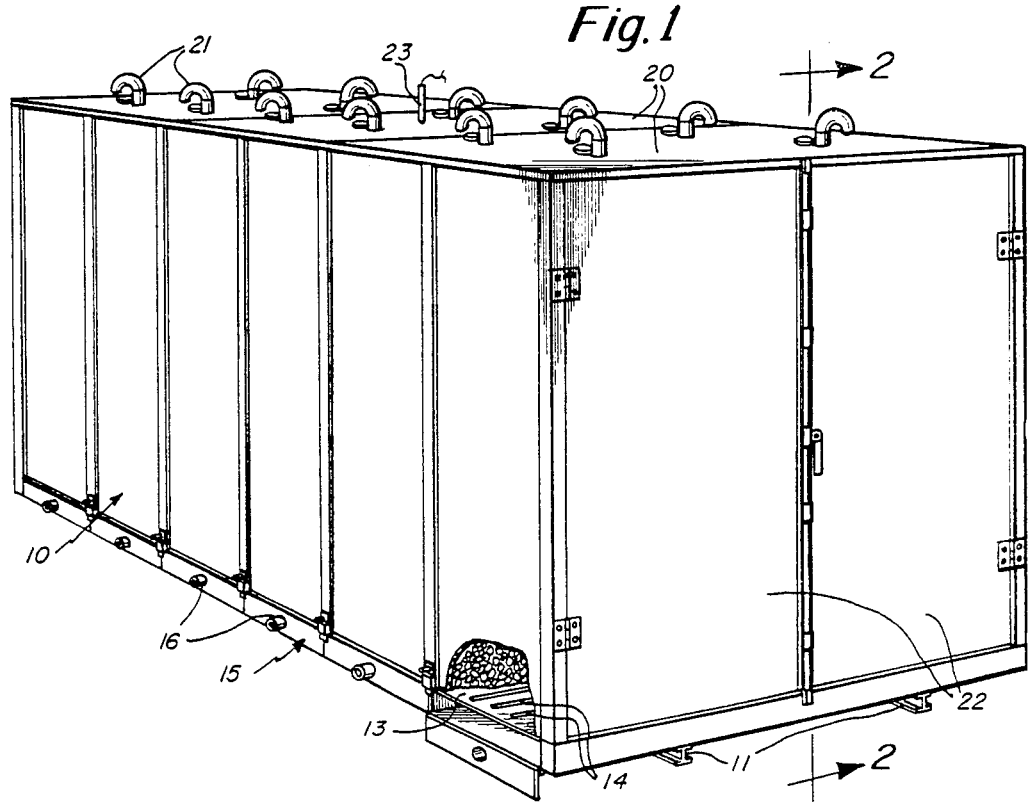
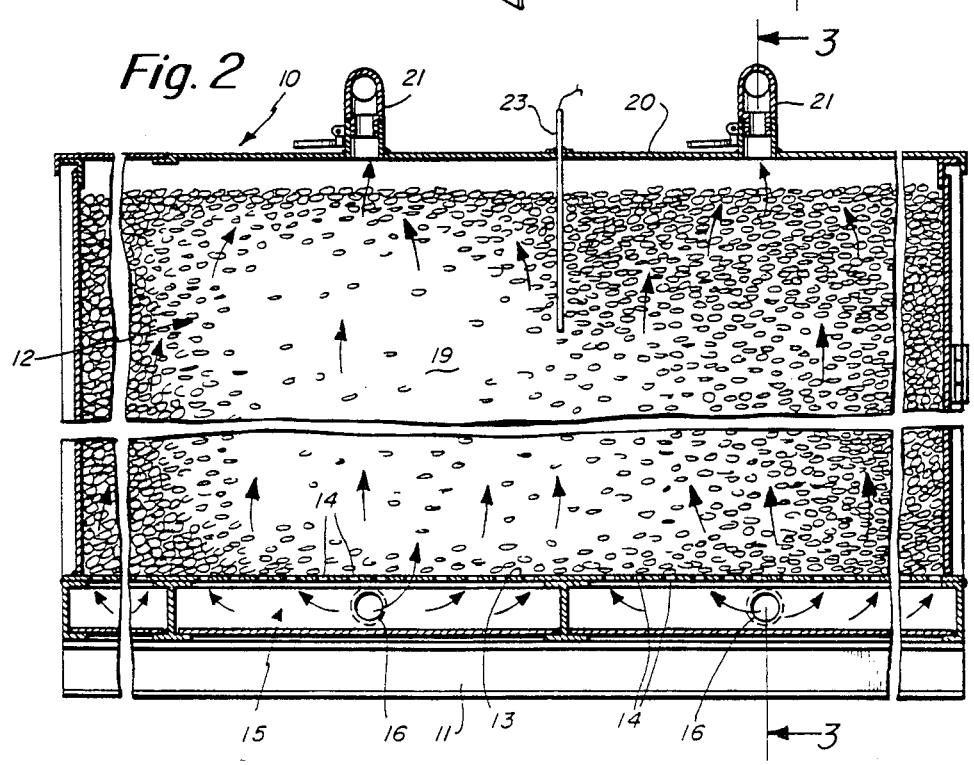

METHOD AND APPARATUS FOR USE IN DRYING BIOMASS PARTICLES

BACKGROUND REFERENCES

U.S. Pat. Nos. 2,442,344, 2,714,258, 2,714,259, 3,910,757.

RELATED APPLICATIONS

Application of Willard C. Sawyer et al., Ser. No. 383,087, filed May 28, 1982 and now abandoned, entitled "Method and Apparatus for Preparing Biomass Particles For Fuel".

Application of Willard C. Sawyer et al, Ser. No. 231,376, filed Feb. 4, 1981, a continuation application based on Ser. No. 124,839, filed Feb. 26, 1980, entitled "Method and Apparatus For Use In Preparing Wood, Biomass Particles For Fuel", all abandoned.

The co-pending application of Willard C. Sawyer et al, Ser. No. 265,182, filed June 1, 1981 and now abandoned, entitled "Method and Apparatus For Use In Drying Biomass Particles".

BACKGROUND OF THE INVENTION

Wood or other biomass particles are quality fuels for stoves, heaters, furnaces, industrial boilers, pyrolizers, and gasifiers and as raw material for pulp mills if their moisture content is within the approximate range of from 5% to 35% wet basis.

It is desirable that biomass particles be so dried as to bring their moisture content within that range at or near their production or harvesting site in order to reduce their weight to effect economies in hauling them to a distribution or to a consuming site. There are two problems in drying wet biomass particles of which the first is that the cost of drying must, for practical reasons, be as much less as possible than the value added to the particles by virtue of their being dried. This problem is overcome by the use of the apparatus and the practice of the methods disclosed in our above referred-to co-pending application.

The second problem is that the drying operation, no matter where carried out, must not be attended by the release into the atmosphere of contaminants whether liquids, gases or solids. As far as we are aware, there are no dryers available that enable wet biomass particles to be dried without releasing such contaminants as particulates, acid and hydrocarbon emissions and, at the same time, to operate at an economical rate of production without expensive add-on equipment.

THE PRESENT INVENTION

The general objective of the invention is to provide dryer and method for operating them that will enable biomass particles, the moisture content of which is too high for their efficient use as fuel or as feed stock for a chemical process such as, but not limited to, pulp mills and ethanol plants, to be economically dried so that they may be so used without the drying operation being attended by the discharge from the dryer to an unwanted extent of such contaminants as have been referred to.

In terms of method, this objective is attained by processing biomass wastes, preferably but not necessarily at or near the site or sites where the wastes were harvested or produced, to provide particles that are substantially all within a size range such that the particles will pass through a four inch mesh screen but not through a one-eighth inch mesh screen. The particles are then collected to provide a body thereof of a predetermined length, width and height. Streams of hot gas the temperature of which is within the approximate range of 50° F. to 660° F. and usually in the 200° F.–350° range, is introduced into the body of particles from one side or boundary thereof and permitted to escape from the opposite side until the average moisture content of the particles is reduced to the wanted extent in the 5% to 35% wet basis range and at the same time the gas stream to the body of particles is so controlled that a layer of particles adjacent said opposite side or boundary serves as a relative cool filter bed that prevents to the wanted extent particulate, acid or hydrocarbon emissions from escaping to pollute the air or harm operators. In practice, drying is achieved with the temperature of the layer forming the filter bed held below that at which any liquids therein would volatilize and to insure that any noxious gases will condense therein, within the approximate range of 50° F. for those purposes.

Other objectives of the invention are to enable proper economical operating conditions to be established and maintained and are attained by controlling the source of the hot gases to so vary the temperature thereof that the wanted temperature of the filtering layer is maintained, by varying the velocity of the gas stream to the body of the particles being dried for the same purpose but with the velocity and pressure of the gas stream such that the particles in the filtering layer are not disturbed by the exiting gas, or by varying both the velocity and temperature of the hot gas stream to achieve that end.

In terms of apparatus, a dryer is provided having a chamber of predetermined width, length, and height with one wall, which may be a side wall or the floor provided with a substantial number of apertures dimensioned to prevent the escape of particles therethrough with a plenum with which the apertures are in communication and to which a source of hot gas is connected to provide a continuous stream into and through the opposite side of the body of particles within the chamber. Means are provided to sense the temperature of the particles in a layer of particles at said opposite side and are operable to operate control means by which the hot gas stream is so controlled as to maintain said layer at a temperature at which it serves as a relatively cool filter bed to condense or entrap to a wanted extent potential contaminants of the atmosphere.

Other objectives of the invention are concerned with the control of the hot gas stream by varying the temperature of the hot gas, its velocity or both its temperature and velocity. As earlier noted, the velocity and pressure of the hot gas is so controlled that surface particles of said layer are not disturbed by exiting gas.

BRIEF DESCRIPTION OF THE DRAWINGS

The accompanying drawings illustrate a preferred embodiment of the invention with FIG. 1 a perspective view of a batch dryer in accordance with the invention;

FIG. 2 is a fragmentary section taken approximately along the indicated line 2—2 of FIG. 1;

THE PREFERRED EMBODIMENT OF THE INVENTION

Figure 3:
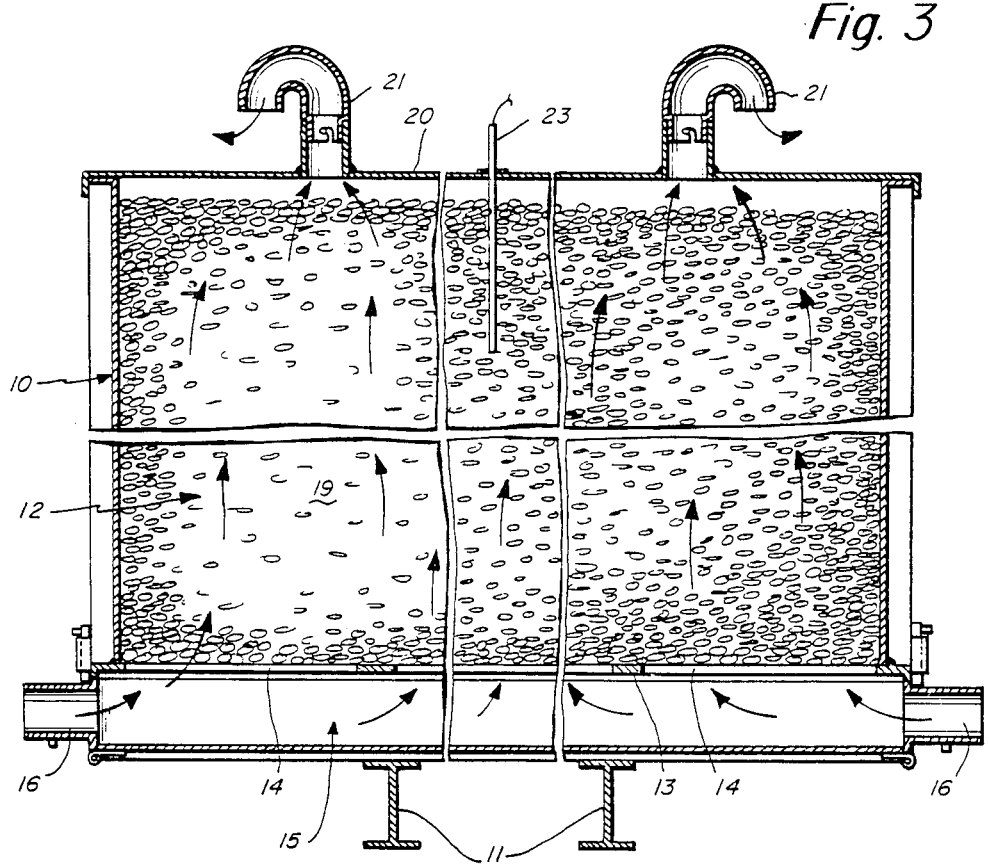
FIG. 3 is a section on the same scale taken approximately along the indicated line 3—3 of FIG. 2.
Figure 4:
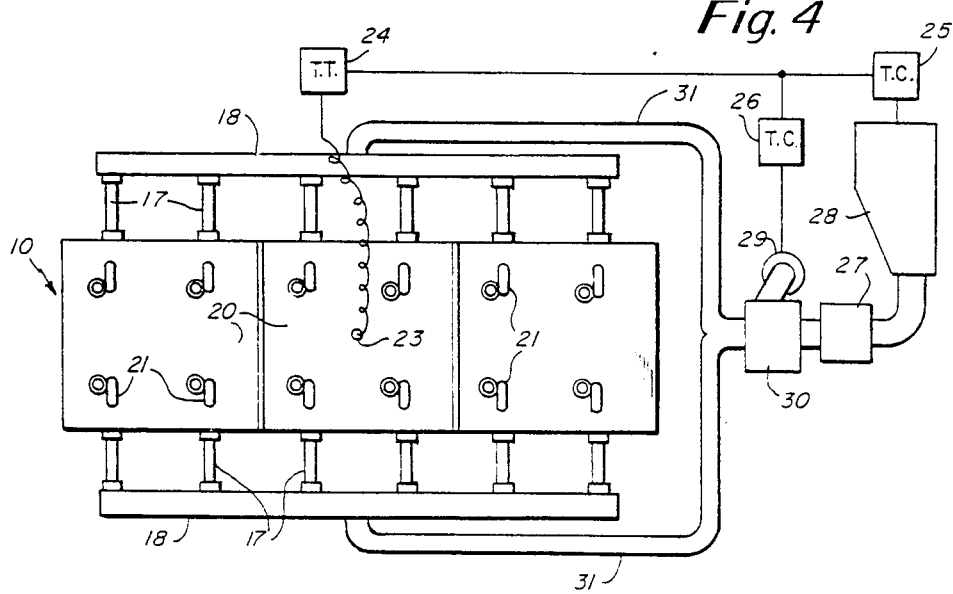
FIG. 4 is a somewhat schematic top plan view of the dryer and the source of hot drying gas connected thereto.

The dryer illustrated by the drawings is generally indicated at 10 and is of the batch type and has a base consisting of I-beams 11 extending lengthwise thereof.

The drying chamber generally indicated at 12 has its floor 13 provided with slots 14 of substantial length and of a width such that the particles to be dried cannot escape therethrough into the underlying plenum 15 which has ports 16 to which are connected conduits 17 through which the hot drying gas is delivered from a manifold 18 through the plenum into and through the body 19 of biomass particles.

The upper boundary of the chamber 12 consists of cover sections 20 provided with vents 21 through which the gas escapes after its passage through the body of particles. The cover sections 20 are removable to enable the chamber to be quickly and easily filled and doors 22 at one end of the dryer enable the dried particles to be removed.

The dryer 10 as thus described is desirably but not necessarily so dimensioned that it can be a trailer or constitute the body thereof and is, as thus far described, conventional.

The ever changing environmental protection requirements are expected to require clean-up equipment to extract liquids, particulates, and gaseous pollutants from the exhaust stream of the dryers. To avoid the heavy cost or the cost of operating existing dryers at reduced capacity to avoid pollutants the preferred method and apparatus for drying biomass particles requires that the particles be confined in a chamber and while the particles are so confined the hot gases used to dry them are introduced at one surface and allowed to leave the opposite surface for a period of time sufficient to remove the moisture to a wanted extent. By substituting increased time, lower temperatures and lower gas velocities for the traditional higher temperature and velocity, the particles themselves provide a filter bed which catches the particles to allow meeting environmental regulations without the costly options previously mentioned. In addition, by reducing both the temperature and the velocity of the drying gases, a temperature and moisture gradation is maintained between the surface at which the gases enter and the surface through which the gases leave. This condition which is induced and controlled at or near the exit surface provides for a temperature sufficiently low to condense or entrap the required quantities of pollutants. Specific reference is made to formic acid, glyoxal, acetic acid and turpentine, all of which require temperatures at the exit surface between 50° F. and 150° F. in order that they may be condensed to meet present or anticipated pollution standards.

While the velocity and pressure of the hot gas stream depends on the volume of particles to be dried and the distance the hot gases must travel before exiting, the pressure should be in the approximate range of 0.5 to 8.00 inches as measured by changes in the level of water in a tube depending on the size of the particles, the degree of their compaction or both. The velocity of the gases should be such as not to disturb the particles forming the surface through which gas exits.

In accordance with the invention, therefor, a probe 23 is inserted through a cover section 20 to extend in the neighborhood of six to eighteen inches into the upper surface of the body of particles depending on the pollution standard to be attained, the deeper the probe extends within this range, the lesser the pollution. This range is applied where, for example, the thickness of the particle body 19 between its gas-entering and gas-exiting surfaces is not less than about four feet. The probe 23 is connected to a temperature transmitter 24 shown as in control of parallel temperature controllers 25 and 26.

The preferred source of hot gas is a burner 27 the fuel for which is hot gas derived from a gasifier 28, such as are manufactured by Forest Fuels Mfg. Co., Inc. of Marlborough, N.H. A blower 29 drives the hot gas from the burner 27 through a blender 30 and the conduits 31 which are connected to the manifolds 18.

The temperature controller 25 is employed to operate the built-in control system of the gasifier 28 to so vary its operation as to increase or decrease the temperature of the hot gas fuel for the burner 27. The temperature control 26 is in control of the operation of the blower 29 thus to control the velocity of the hot gas stream to the dryer.

Either or both bases of control may be used to maintain the temperature in the monitored layer in the 50° F. to 150° F. range and the temperature of the hot gas delivered to the chamber in the preferred range of from 50° F. to 600° F., usually 200° F. to 350° F., to effect the drying of the particles to the desired extent in the 5%–35%, wet basis.

In practice, dryers eight feet in width, five feet in height and varying in length from twenty-eight to forty-five feet have proved to be satisfactory. Dryers of other dimensions may be used provided that the hot drying gases are well distributed throughout the contained body of particles with the drying time, temperature and pressure controlled to establish the essential filter layer for each dryer.

We claim:

1. Method of preparing biomass particles for use as fuel for stoves, heaters, furnaces, industrial boilers, pyrolizers and gasifiers or for use as feed stock for a chemical process, by way of examples, pulp mills and ethanol plants, said method consisting of the steps of processing biomass wastes to provide particles substantially all within a size range that they will pass through a four inch mesh screen but not through a one-eighth inch mesh screen, collecting said particles to provide a body thereof that is substantially uniform in width and depth throughout the length thereof, providing a continuous stream of hot gas the temperature of which is within the approximate range of from 50° F.–600° F., subjecting the body of said sized particles to the hot gas stream to reduce the moisture content of the particles on an average to a wanted extent in the approximate range of from 5% to 35% wet basis by introducing the hot gases through one surface of the body of particles and permitting the gas to escape from the opposite surface thereof while controlling the velocity and pressure of the gas stream to enable the layer of particles adjacent the opposite surface to serve as a relatively cool filter bed the temperature of which is in the approximate range of 50° F. to 150° F. to condense and/or to trap to the desired extent particulates and/or acids or hydrocarbon emissions from entering the air or harming operators.

2. The method of claim 1 in which the temperature of the hot gas is within the approximate range of from 200° F.–350° F.

3. The method of claim 1 in which the velocity and pressure of the gas is such that the particles of said opposite surface are not disturbed by exiting gas.

4. The method of claim 1 in which the step of controlling the gas includes the step of monitoring the temperature of said layer and controlling the temperature of the gas stream to maintain that temperature of said layer in said approximate range.

5. The method of claim 1 in which the step of controlling the gas includes the steps of monitoring the temperature of said layer and controlling the velocity of said gas stream to maintain the temperature of said layer in said predetermined range.

6. The method of claim 1 in which the step of controlling the gas includes the steps of monitoring the temperature of said layer and controlling the velocity of said gas stream and the temperature thereof to maintain the temperature of said layer in said predetermined range.

7. A dryer for use in drying wood and other biomass particles that are substantially all within a size range such that they will pass through a four inch mesh screen but not through a one-half inch mesh screen, said dryer including a chamber for a body of particles, one wall of said chamber provided with a substantial number of apertures dimensioned to prevent particles from passing therethrough, plenum means with which said apertures are in communication, a source of hot gas connected to said plenum means and operable to deliver a continuous stream of hot gas thereto, into and through the particles and then to exit from the opposite side of the body, means to sense the temperature of a layer of particles adjacent the opposite chamber wall and means responsive thereto to so control said gas stream that said layer functions as a stable filter bed the temperature of which does not exceed the approximate range of 50° F.–150° F. to prevent such contaminating emissions as particulate matter, acid and hydrocarbon emissions from escaping from the dryer to an unwanted extent.

8. The dryer of claim 7 in which the means responsive to the temperature sensing means includes means operable to provide said hot gas stream and including a blower, a temperature controller operated by said sensing means to control said last named means to vary the temperature of the gas stream to maintain the temperature of said layer in said approximate range.

9. The dryer of claim 8 and a second temperature controller operated by said sensing means and in control of said blower to vary the velocity of said stream.

10. The dryer of claim 7 in which the source of hot gas includes a blower in control of the gas stream to impart wanted velocity thereto and the means responsive to the temperature sensing means includes a temperature controller in control of said blower to so very the gas stream velocity as to maintain the temperature of said layer in said approximate range.

* * * * *